(No Model.)
N. NILSON.
STEAM TRAP.
No. 557,693.   Patented Apr. 7, 1896.
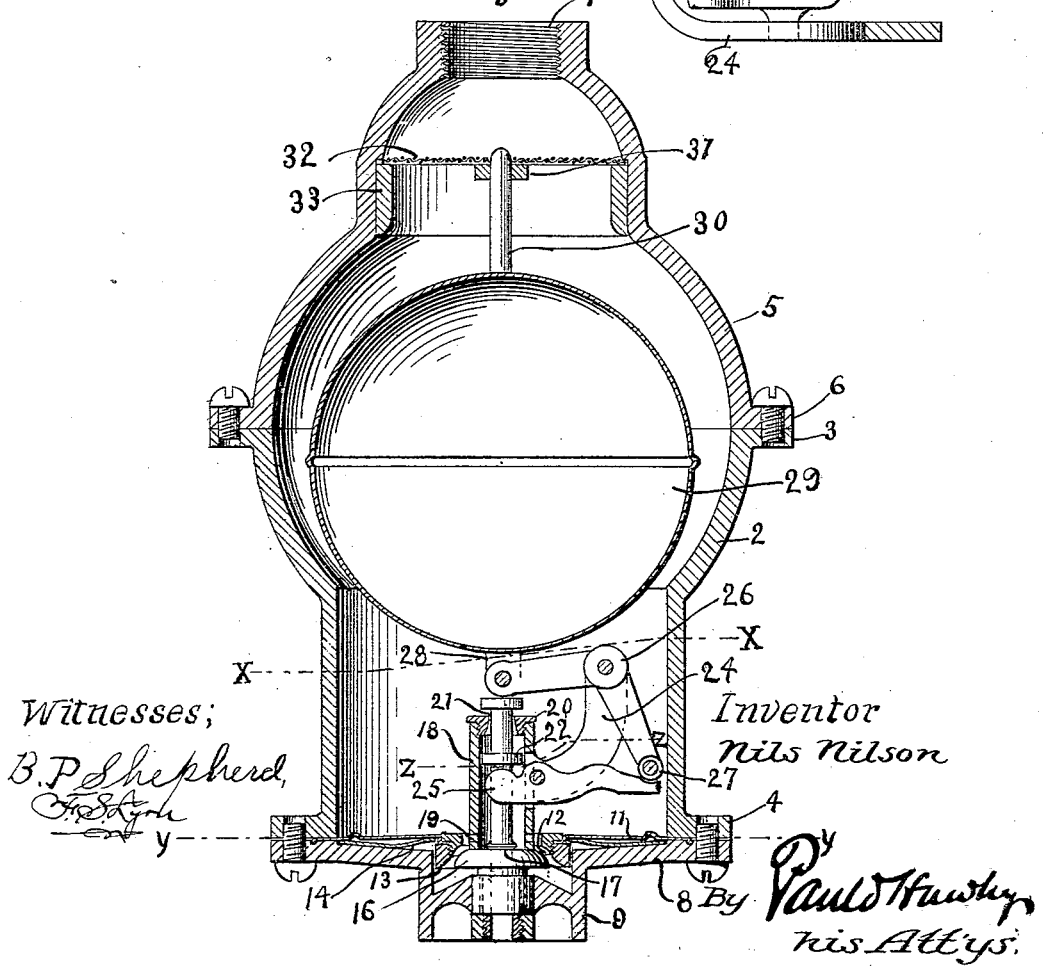

UNITED STATES PATENT OFFICE.

NILS NILSON, OF MINNEAPOLIS, MINNESOTA, ASSIGNOR TO THE NILSON MANUFACTURING COMPANY, OF ST. PAUL, MINNESOTA.

STEAM-TRAP.

SPECIFICATION forming part of Letters Patent No. 557,693, dated April 7, 1896.

Application filed August 12, 1895. Serial No. 558,957. (No model.)

*To all whom it may concern:*

Be it known that I, NILS NILSON, of the city of Minneapolis, county of Hennepin, State of Minnesota, have invented certain new and useful Improvements in Steam-Traps, of which the following is a specification.

My invention relates to steam-traps; and the object I have in view is to provide a simple and very durable trap which will be non-freezing.

A further object is to provide a trap with a diaphragm of large area, whereby the trap will close under a low pressure and open under a high pressure of steam, and a still further object is to provide a trap of such construction that it will be quickly relieved of the accumulated water when the pressure has been shut off.

My invention consists generally in various constructions and combinations, all as hereinafter described, and particularly pointed out in the claims.

In the accompanying drawings, forming part of this specification, Figure 1 is a vertical sectional view of a steam-trap embodying my invention. Fig. 2 is a sectional view on the line $x\,x$ of Fig. 1. Fig. 3 is a sectional view on the line $y\,y$ of Fig. 1. Fig. 4 is a similar view on the line $z\,z$ of Fig. 1.

In the drawings, 2 represents the lower portion of the casing of the trap, being bulged at its upper end and provided at its upper and lower edge with the flanges 3 and 4. The upper part 5 of the trap is provided with a flange 6 to rest upon the flange 3 and is secured thereto by screws or bolts, as shown in Fig. 1. The upper end of the part 5 is also provided with a large threaded opening 7 to receive the steam-supply pipe. To the under side of the flange 4 is secured a cap 8, forming the bottom of the trap and having a downward extension 9 near its center, which is provided with an opening through which the water flows from the trap when the valve is opened.

In the bottom of the trap and having its edges secured between the flange 4 and the edges of the bottom 8 I provide a diaphragm 11, having a central opening, within which is arranged the valve-seat 12, supported by the diaphragm and provided upon its under side with a beveled edge to receive the valve-disk. The outer edge of the valve-seat, below the diaphragm, is threaded to receive the threaded ring 13, which fits within the extension 9 and forms a guide for the valve-seat as it is raised or lowered by the movement of the diaphragm.

Beneath the diaphragm 11 and resting upon the upper surface of the part 8 I provide a plate 14, having a central opening corresponding to the opening in the diaphragm and a series of slots radiating therefrom, forming a series of sectors 15, which tend to hold the diaphragm in its normal horizontal position and to raise the same up when depressed by the pressure of steam.

Beneath the opening in the diaphragm 11 and secured within the opening 10 I provide the valve-disk 16, provided with a central opening 17 and having a beveled upper surface to receive the beveled under surface of the seat 12. Upon the upper side of the valve-disk 16 and extending up through the opening in the diaphragm is a cylindrical portion 18, having a series of openings or ports 19 near its lower end and threaded at its upper end to receive the cap 20, through which the stem of the auxiliary valve 21 extends to cover the central opening in the valve-disk 16.

The auxiliary valve 21 is provided with an annular flange or ring 22 within the cylindrical portion 18 and a similar flange 23 at the upper end of its stem, above the cap 20. When the valve is raised up, the flange 22 strikes the under side of the cap 20, which limits the movement of the valve in an upward direction.

The portion 18 is provided at one side with the outwardly-curved and upwardly-extending arms 24 upon either side of a longitudinal slot in said cylindrical portion, and an arm 25 is pivoted to said arms 24 within said slot, said arm being forked at its inner end to pass upon both sides of the auxiliary valve 21, and the outer end of said arm extending nearly to the casing of the trap, as shown in Fig. 1.

Pivoted to the upper end of the arms 24 is the bell-crank lever 26, one of its arms being provided at its lower end with a roller 27 to bear upon the upper edge of the arm 25, and its opposite arm pivoted to a lug 28 provided upon the under surface of the float 29, and resting upon the upper surface of the ring 23 on the end of the auxiliary-valve stem. The float 29 is provided upon its upper side with a stud 30, which extends up through a guide 31 provided in the upper part of the casing 5. A screen 32 is also provided in the upper part of the casing, being held in place therein by a ring 33, as shown in Fig. 1.

The arm 25 is provided with an uneven upper surface, over which the roller 27 passes, so that the auxiliary valve will be raised slowly at first and rapidly at the end of its stroke.

The cover 8 is provided with an annular groove 35 upon its upper surface near the outer edge, and the edge of the diaphragm is turned down to fit into this groove, so that the diaphragm, when placed in position, will center itself.

The operation of the trap is as follows: Steam being admitted through the opening 7 in the upper part thereof, and passing down through the screen 32, strikes the upper surface of the diaphragm 11, forcing it and the valve-seat down upon the disk 16 against the pressure of the spring-sectors 15. As the water accumulates in the trap from the condensation the float is slowly raised, and with it the auxiliary valve 21, through the movement of the arms 25 and the bell-crank lever 26, allowing the water to flow through the openings or ports 19 and the central opening 17 in the valve-disk to the waste-pipe at the bottom of the trap. When the steam-pressure is shut off, the spring parts or sectors will raise the diaphragm up and lift the valve-seat off the disk 16, thereby opening the main valve and permitting the water to flow rapidly from the trap, and thereby obviating the danger of the trap freezing up when the steam is shut off, and as the valve normally stands open the trap will always be free from water when not in use.

Having thus described my invention, I claim as new and desire to secure by Letters Patent—

1. In a steam-trap, the combination, with a casing of a diaphragm arranged therein, a main valve having a movable seat and a stationary disk, and arranged to be opened or closed by the movement of said diaphragm, an auxiliary valve, and means for moving the same independently of said main valve, and permitting the water to escape from said trap when said main valve is closed, substantially as described.

2. In a steam-trap, the combination with the casing having the inlet and outlet openings, of a diaphragm arranged therein and provided with a central opening, a valve-seat supported by said diaphragm within said opening, a disk arranged beneath the same to receive said seat when forced down by the depression of said diaphragm, an auxiliary valve supported by said disk, and means for raising or lowering said auxiliary valve independently of said main valve and permitting the escape of water from said trap, substantially as described.

3. In a steam-trap, the combination, with the casing having the inlet and outlet openings, of the main valve arranged to close said outlet-opening, and comprising a stationary disk and a movable seat, a diaphragm arranged above said disk, and supporting said seat, whereby the same will be forced down upon said disk by the depression of said diaphragm, means for raising said diaphragm to its normal position after the removal of the pressure thereon, an auxiliary valve, and means for operating the same independently of said main valve, substantially as described.

4. In a steam-trap, the combination with the casing having the inlet and outlet openings, of the main valve arranged in said outlet-opening, said valve having a movable seat and a stationary disk, said disk being provided with a central opening, a diaphragm arranged above said disk, and supporting said seat within an opening provided therein, a tube or cylinder supported by said disk, and provided with a series of openings, an auxiliary valve arranged within said tube or cylinder, and adapted to close the opening in said disk, and means for raising the same to permit the escape of water when the main valve is closed, substantially as described.

5. In a steam-trap, the combination, with the casing having the inlet and outlet openings, of the main valve, a diaphragm, said valve being arranged to be closed by the depression of said diaphragm, a tube or cylinder supported by said main valve over an opening provided in the disk thereof, said cylinder being provided with a series of openings and with a longitudinal slot in its side walls, an auxiliary valve arranged within said tube for covering the opening in said disk, a pivoted arm extending through said longitudinal slot into engagement with said auxiliary valve, a float in the upper part of said casing, said float being provided upon its under surface with a bell-crank lever having its lower arm in engagement with said pivoted arm, for the purpose set forth.

6. In a steam-trap, the combination, with a casing, of a diaphragm arranged within the same over an outlet-opening provided therein, said diaphragm having a central opening, a main valve for closing said outlet-opening, and having a stationary disk and a movable seat carried by said diaphragm, the spring beneath the same, the tube or cylinder 18 having the ports 19 and the arms 24, the auxiliary valve within said tube covering an opening in said disk, the pivoted arm 25 for raising said auxiliary valve, the float 29, the bell-crank lever 26 supported by said arms 24 and having one end pivoted to said float and its opposite end in engagement with said pivoted lever, and said float being provided with a guide on its upper surface, for the purpose set forth.

7. In a steam-trap, the combination, with the casing having the inlet and outlet openings, of the diaphragm, the main valve for closing said outlet-opening, the auxiliary valve carried by said main valve, the pivoted arm 25 having one end in engagement with said auxiliary valve, the float 29, the pivoted bell-crank 26 having one arm connected to said float, the roller provided upon the opposite arm of said bell-crank and adapted to roll upon the surface of said lever 25, whereby when said float is raised by the accumulated water in the trap said auxiliary valve will be raised simultaneously, substantially as described.

In testimony whereof I have hereunto set my hand this 2d day of August, A. D. 1895.

NILS NILSON.

In presence of—
RICHARD PAUL,
A. C. PAUL.